(12) United States Patent
Levin

(10) Patent No.: US 9,677,786 B2
(45) Date of Patent: Jun. 13, 2017

(54) OPEN-FLOW SOLAR COLLECTOR

(71) Applicant: Alexander Levin, Binyamina (IL)

(72) Inventor: Alexander Levin, Binyamina (IL)

( * ) Notice: Subject to any disclaimer, the term of this patent is extended or adjusted under 35 U.S.C. 154(b) by 744 days.

(21) Appl. No.: 13/714,697

(22) Filed: Dec. 14, 2012

(65) Prior Publication Data
US 2014/0165995 A1 Jun. 19, 2014

(51) Int. Cl.
| | | |
|---|---|---|
| F24J 2/23 | (2006.01) | |
| F24J 2/05 | (2006.01) | |
| B01D 1/00 | (2006.01) | |
| B01D 1/22 | (2006.01) | |
| F24J 2/46 | (2006.01) | |

(52) U.S. Cl.
CPC .............. *F24J 2/23* (2013.01); *B01D 1/0035* (2013.01); *B01D 1/0064* (2013.01); *B01D 1/221* (2013.01); *F24J 2002/4603* (2013.01); *Y02E 10/44* (2013.01)

(58) Field of Classification Search
CPC ....... Y02E 10/44; F24J 2/26; F24J 2/23; F24J 2002/4603; B01D 1/221; B01D 1/0064; B01D 1/0035
USPC ........................................................ 126/652
See application file for complete search history.

(56) References Cited

U.S. PATENT DOCUMENTS

| | | | | |
|---|---|---|---|---|
| 3,995,804 A | * | 12/1976 | Folds | F24J 2/23 126/569 |
| 4,036,209 A | * | 7/1977 | Press | F24J 2/201 126/626 |
| 4,135,490 A | * | 1/1979 | Soleau, Jr. | F24J 2/0483 126/643 |
| 4,142,513 A | * | 3/1979 | Auger | F24J 2/23 126/634 |
| 4,161,809 A | * | 7/1979 | Severson | B21D 53/04 126/666 |
| 4,426,999 A | * | 1/1984 | Evans | F24J 2/202 126/569 |
| 4,936,290 A | * | 6/1990 | Smith | F24J 2/0477 126/620 |
| 5,724,479 A | * | 3/1998 | Takahashi | E04D 13/103 126/675 |
| 2007/0224929 A1 | * | 9/2007 | Chen | F24F 7/02 454/339 |
| 2011/0005121 A1 | * | 1/2011 | Gelber | A01K 97/06 43/57.1 |

* cited by examiner

*Primary Examiner* — Steven B McAllister
*Assistant Examiner* — Rabeeul Zuberi

(57) ABSTRACT

The invention relates to a field of open-flow solar collectors, and specifically to flat solar collectors with wetting the underneath sides of their solar radiation absorbing plates with liquid heat transfer medium. More specifically, the invention proposes the flat solar collector, which operates with relatively low flow rate of the heat transfer medium on the underneath side of the solar radiation absorbing plate, with flow in form of some rivulets. The invention describes some technical solutions, which restrict meandering rivulets' flow. The proposed flat solar collector can be applied for heating water or other liquids and for evaporation and concentration of aqueous solutions.

3 Claims, 7 Drawing Sheets

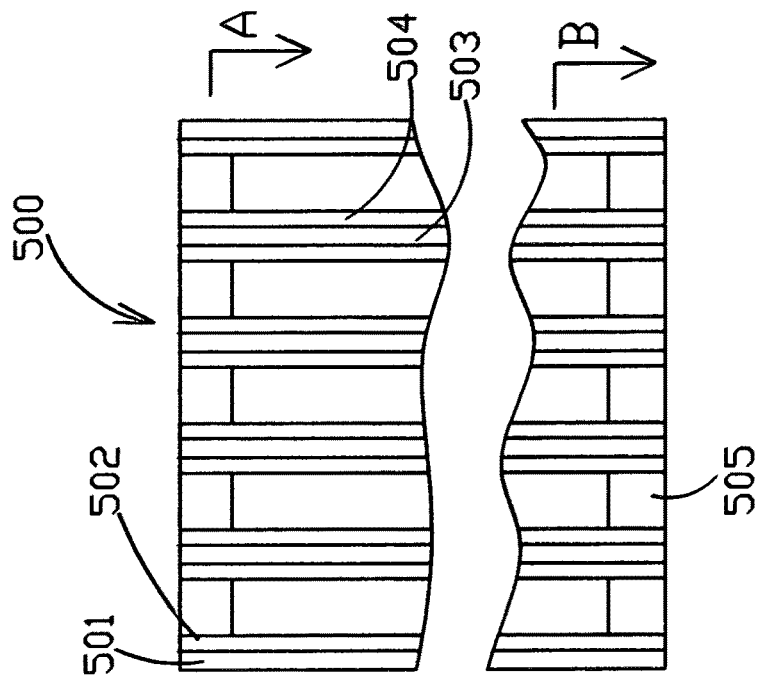
FIG. 5a
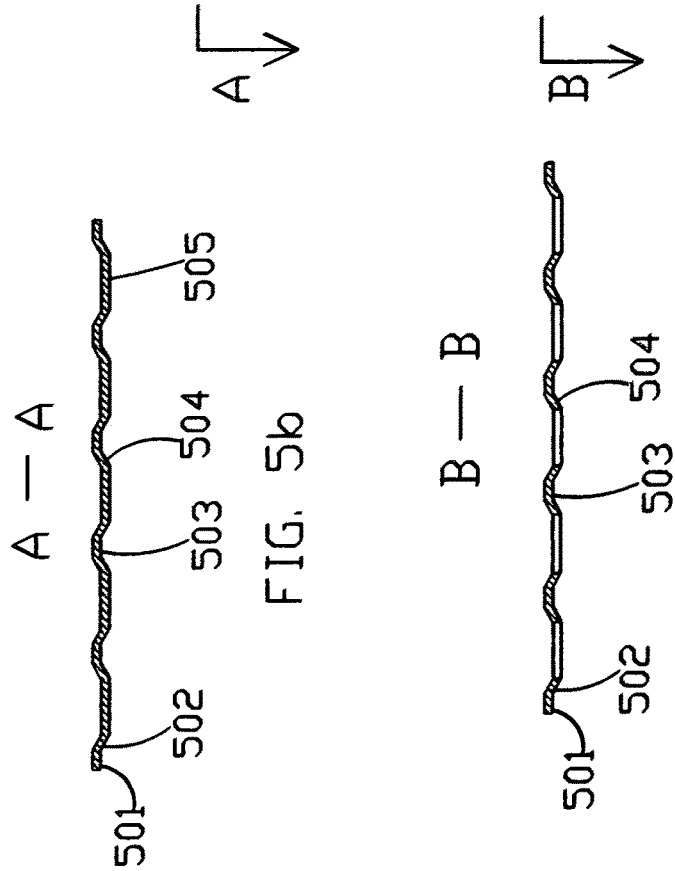
FIG. 5b
FIG. 5c

OPEN-FLOW SOLAR COLLECTOR

FIELD OF THE INVENTION

The invention relates to the field of flat-plate solar collectors and, particularly, to open-flow flat-plate solar collectors.

BACKGROUND OF THE INVENTION

The invention relates to a field of open-flow flat-plate solar collectors, and, specifically, to flat-plate solar collectors with wetting the underneath sides of their solar radiation absorbing plates by liquid heat transfer medium.

Such solar flat-plate collectors and heat transferring units are disclosed in some U.S. patents.

U.S. Pat. No. 4,003,365 discloses a structure for collecting solar energy and storing the same as heat in a body of water. An inclined southerly wall is provided with a solar absorption surface protected from convection losses by a transparent membrane overlaying the absorption surface. The absorption surface is also formed as a membrane which is wetted at its underside within the structure by water spray and as solar radiation is absorbed and converted to heat at the membrane, the water at the underside of the membrane is heated. This heated water drops from the membrane and flows to a reservoir.

U.S. Pat. No. 4,085,732 describes a method and apparatus for heating a liquid using solar energy. Through the use of an absorber plate made of a sheet of copper or any other similar conductive metal, the heat from the sun is captured. The front surface of the plate is covered with a dark absorbent coating. The heat absorbed by the copper sheet is conducted to a thin film of liquid such as water which is fed by gravity down the backside of the plate from a supply line disposed adjacent to the top of the backside of the plate. The liquid absorbs the heat from the plate as it flows downward covering the backside of the plate and is discharged at the bottom of the plate into a drain line. The drain line removes the heated liquid from the apparatus.

U.S. Pat. No. 5,460,164 discloses a solar heat collector roof comprises an absorber plate (1) for incident radiation energy and a heat exchange plate placed directly thereunder. The heat exchange plate is corrugated in such a manner that it comprises channels extending down along the roof The heat exchange plate is moreover in direct contact with the absorber plate thereabove. A heat carrying or heat removing liquid medium, e.g. water, flows in the channels. The liquid medium, which removes heat from the heat exchange plate, is supplied at such a rate that the flow rate down along the roof in the channels lies below the rate at which the surface tension of the heat carrying medium is broken, so that a winding (meandering) and travelling flow pattern is imparted thereby to the liquid medium, and up along the channel walls.

U.S. Pat. No. 4,261,337 describes a solar heat collector includes an enclosure having a solar energy transmitting cover member and a solar energy absorbing base member. Within the enclosure, structure is provided, connected to a fluid inlet, for causing a stream or film of fluid to flow along the interior surface of the cover member. The same structure may be used to impart a separate flow of fluid along the energy absorbing base member. The cover member is oriented to prevent the gravitational forces on the fluid stream, flowing along the interior surface of the cover member, from overcoming the adhesion forces between the stream and the interior surface of the cover member. This stream removes condensation from the cover member as it captures heat therefrom. The stream may be created by spraying fluid on the interior surface of the cover member or by a fluid dispensing member having a fluid outlet adjacent the interior surface of the cover. Means for distributing the fluid across the interior surface as same flows therealong may also be provided.

U.S. Pat. No. 4,121,568 teaches a system for collecting heat energy from solar radiation to heat a liquid medium. The system includes a solar radiation collector plate which has its rear face adapted to cause a liquid medium to be in direct thermal contact with the rear face of the plate while flowing over and covering essentially all of the rear face. According to one important aspect of the invention, the rear face is provided with a material having capillary attraction properties to spread a liquid medium across essentially all of the rear face of the plate so that the liquid medium absorbs large amounts of heat energy from the collector plate.

U.S. Pat. No. 4,108,057 teaches a solar water heater is positioned in an inclined manner with an inlet at the upper portion and an outlet at the lower portion so that the water flows downwardly over a series of corrugations extending transversely to the direction of flow of water, the water spilling over each corrugation in turn.

U.S. Pat. No. 4,124,020 describes a solar energy collector has a corrugated, inclined plate exposed to solar rays on a blackened front or top side thereof. A heat-absorbing liquid carrier adheres to an opposite rear or undersurface of the plate in the form of a thin sheet by surface tension, and is directed gravitationally to a collection trough at the bottom edge of the plate.

U.S. Pat. No. 3,995,804 discloses an inclined heat absorptive and conductive panel including downwardly opening inverted V-shaped grooves formed therein extending downwardly from the upper end portion of the panel toward the lower end portion of the panel is provided. In addition, structure is provided for introducing a heat absorptive liquid into the upper end portions of the grooves and second structure is provided for receiving and collecting liquid from the lower ends of the grooves. The cross sectional shape and size of the grooves is such to allow at least substantially all of the liquid introduced into the upper ends thereof to be retained therein by the cohesive and surface tension properties of the liquid during its movement downwardly through the grooves by gravity toward the lower end of the panel. The panel comprises an inclined partition secured across the interior of an upwardly opening housing and a substantially fluid tight cover is secured across the top of the housing above the panel. Further, the structure by which liquid flowing downwardly to the lower end of the panel is collected includes additional structure whereby a partial vacuum is maintained within the housing between the transparent cover and the heat absorptive panel.

U.S. Pat. No. 3,943,911 discloses a solar heat exchanger, which comprises: A. a base and an extended surface thereon for facing frontwardly toward the sun, B. means communicating with said surface to conduct liquid to flow in dispersed condition adjacent said surface, and C. a sheet overlying said surface and spaced therefrom sufficiently closely to cooperate therewith for filming the flowing liquid, said sheet adapted to receive solar radiation for promoting heat transfer to the filmed and flowing liquid U.S. Pat. No. 3,146,774 describes a solar collector, which is constructed similarly to the solar collector of U.S. Pat. No. 3,943,911.

These patents have a common drawback: in order to ensure complete wetting of the backside of the absorbing plate they would be forced to apply relatively high flow rates (200 kg/mh or more) of water or aqueous solution supplied into their distributing pipes. This value of the required flow rate is presented, for example, in the book: S. S. Kutateladze HANDBOOK OF HYDRODYNAMIC PRESSURE DROPS AND HEAT TRANSFER, Energoatomizdat, Moscow 1990, p. 178 (in Russian).

On the other hand, flow rate of 40 kg/mh or less is sufficient for a common 1.8-square-meter flat plate solar collector. For the flat plate solar collectors, which are intended to concentrate a diluted solution of liquid desiccant (as, for example, aqueous solutions of LiC1 or CaCl.sub.2) this flow rate can be estimated as 10-15 l/hm.

In such a way, the aforementioned common solar collectors require usage of pumps with relatively high power; it leads to additional expenses for equipment and electric energy.

Only U.S. Pat. No. 3,995,804 has not this drawback and can operate with low flow rates. However, this patent does not give solution of anticorrosive polymer coating of the backside of the solar radiation absorbing plate (such polymer coating can fulfill the inverted V-shaped grooves described in this patent). In addition, U.S. Pat. No. 3,995,804 does not solve a problem of a relatively small general surface of rivulets flowing on the backside of the solar radiation absorbing panel.

Secondly, it is known that oxygen entering into an open loop hydraulic solar system will cause rust in any iron or steel component. Such systems should have copper, bronze, brass, stainless steel, plastic, rubber components in the plumbing loop.

Therefore, if the solar radiation absorbing plate is fabricated from a common carbon steel sheet, its backside to be coated with a layer of thermo-stable polymer anticorrosive material.

BRIEF SUMMARY OF THE INVENTION

This invention proposes a design of a flat-plate solar collector, which is characterized by rivulets' flow on the backside of its solar radiation absorbing plate; i.e. flow rate of water, antifreeze liquid medium or aqueous solution supplied on the upper section of the backside of the solar radiation absorbing plate is significantly lower than the minimum flow rate, which ensures formation of an entire liquid film flowing on the backside of this solar radiation absorbing plate.

It is known that for low magnitudes of liquid flow rate on an inclined or vertical plate the liquid flow pattern is characterized by a system of narrow rivulets with relatively small width (for water and aqueous solutions in the order of 1-8 millimeters).

Detailed theoretic analysis of rivulets' flow and their stability is presented in the article: E. S. Benilov, "On the stability of shallow rivulets", J. Fluid Mech. (2009), vol. 636, pp. 455÷474. Pp. 461÷462 of this article gives demonstration of stability of a rivulet flowing on the underside (backside) of an inclined plate.

The article: A. Daerr et al. "General Mechanism for the Meandering Instability of Rivulets of Newtonian Fluids", PHYSICAL REVIEW LETTER, SPRL 106, 184501 (2011) demonstrates that a rivulet flowing down an inclined plane often does not follow a straight path, but starts to meander spontaneously. This instability is the result of two key ingredients: fluid inertia and anisotropy of the friction between the rivulet and a substrate. Meandering only occurs if the motion normal to the instantaneous flow direction is more difficult than parallel to it. Above the threshold, the rivulet follows an irregular pattern with a typical wavelength of a few cm.

The article: Nolwenn L E GRAND-PITEIRA et al. "What governs rivulet meanders on an inclined plane?", Oct. 11, 2005, CCSD--00011140, Internet, shows that a rivulet flow is highly hysteretic: the shape of the meanders varies with flow rate only for increasing flow rates, and the straight rivulet regime does not appear for decreasing flow rate.

Also, a main object of this invention is to provide simple means limiting the meandering phenomena of rivulets flowing on the backside of a solar radiation absorbing plate.

A flat-plate solar collector, which is proposed in this invention, is designed from following main units:

a housing with an internal thermal insulation of its bottom and side walls; the internal surfaces of the layers of the thermal insulation are covered with impervious layers;

a glazing of the upper aperture of the housing (in some designs of the solar collector the glazing may be omitted);

a solar radiation absorbing plate, which is fastened underneath the glazing in the housing and sealed with this housing or with the impervious side walls' layers of the thermal insulation;

a distributing pipe; the proximal section of this distributing pipe is placed outside the housing, and its middle and distal sections are installed on the backside of the solar radiation absorbing plate; the middle and distal sections of this distributing pipe are provided with openings (or nozzles), which supply evenly water or aqueous solution on the upper section of the backside of the solar radiation absorbing plate; the upper section of the absorbing plate backside is provided with some pipe clips serving for fastening the distributing pipe;

rivulets' flow restricting longitudinal means, which divide the backside of the solar radiation absorbing plate into a set of parallel zones; these rivulets' flow restricting longitudinal means entrap the rivulets when they meet the rivulets' flow restricting longitudinal means with following transformation of the shapes of these rivulets and flowing the rivulets in their transformed shapes along the rivulets' flow restricting longitudinal means;

an outlet connection, which is situated in lower section of the housing of the solar collector and serves for withdrawing the water, aqueous solutions or another liquid medium from the internal space of the flat solar collector (the space between the solar radiation absorbing plate and the impervious layer of the thermal insulation);

a venting opening, which provides fluid communication of the internal space of the flat solar collector with the surrounding atmosphere.

The flat solar collector, which is intended for evaporation and concentration of aqueous solutions, should be provided with an inlet connection and an outlet connection for supplying and removal of the air. In this case the venting opening may be lacking.

The rivulets' flow restricting longitudinal means can be designed on the base of several physical principles.

These restricting means may operate on the base of capillary forces, gravitational force or by application of body force tangent to the substrate surface in opposite direction as a driving shear surface (see, for example, S Marshall and S. Wang CONTACT LINE FINGERING AND RIVULET FORMATION IN THE PRESENCE OF SURFACE CONTAMINATION, Computers & Fluids, V. 34, Issue 6 Jul. 2006, pp. 664-683).

It should be noted, that for very low values of flow rate a drop-wise flow can precede formation of rivulets' flow. The invention proposes in this case the same flow restricting longitudinal means as for rivulets' flow.

In a first version of the invention the rivulets' flow restricting longitudinal means are designed as strips fabricated from fridge magnets (polymer bond magnets), which are arranged on the backside of a steel absorbing plate; this steel absorbing plate has required ferromagnetic properties ensuring tight adjacency of the fridge magnet strips to the backside of the steel absorbing plate.

The fridge magnet strips are fabricated preferably on the base of thermo-stable polymer.

The backside of the solar radiation absorbing plate is preferably covered with corrosion resisting thermo-stable paint.

Rivulets (or drops) are built up by supplying water (or aqueous solution) provided from the openings of the distributing pipe, which is fastened on the upper section of the backside of the solar radiation absorbing plate.

The rivulets are flowing downwards along this backside of the solar radiation absorbing plater and, in the case of their meandering and contacting with the edges of the fridge magnet strips, they continue to flow along these edges as a result of the capillary force.

The second version of the invention proposes application of relatively short fridge magnet strips, which are arranged on the backside of the solar radiation absorbing plate as longitudinal rows of the cascade-wise fridge magnet strips, wherein each fridge magnet strip in one row of the longitudinal cascade-wise system has a certain angle with the longitudinal direction (main direction of free rivulets' flow) of the solar collector; this angle is chosen in such a way, that it ensures flowing each rivulet along the edge of the fridge magnet strip from a place of their initial contact. This allows increasing the total surface of the rivulets flowing on the aforementioned backside of the solar radiation absorbing plate.

In the third version of the invention a steel absorbing plate has required ferromagnetic properties and its backside is covered with a corrosive resisting paint.

In the following version of this invention the solar radiation absorbing plate can be provided with longitudinal depressions directed upwards (orthogonally to the plane of the solar radiation absorbing plate); the width of each depression somewhat larger than the width of the fridge magnet strips and the depth of the depressions is a little (about 0.1-0.2 mm) less than the thickness of the fridge magnet strips. The fridge magnet strips are placed in these depressions.

This allows attaching to the fridge magnet strips from below longitudinal strips from ferromagnetic steel; these longitudinal strips are covered by anticorrosive paint from their both sides and edges.

In another sub-version, an auxiliary grate from ferromagnetic steel is attached from below to the fridge magnetic strips placed in aforementioned depressions; this auxiliary grate is covered by an anticorrosive paint from its both sides and edges and is designed from longitudinal strips with the width and the arrangement, which conform the width and the arrangement of the fridge magnet strips placed in the depressions. The longitudinal strips of the grate are preferably provided with beads as it has been described above.

It should be noted that the auxiliary grate (or strips) itself does not present a capillary taking up structure.

However, combination of the solar radiation absorbing plate with the fastened auxiliary grate provides wetting of a significant part of the backside of the solar radiation absorbing plate by the supplied water or aqueous solution owing capillary effect caused by the narrow gaps between the auxiliary grate (or strips) and the backside of the solar radiation absorbing plate.

The proposed solar collector should be installed with a certain angle of inclination to the horizontal plane.

In addition, the upper and lower edges of the solar radiation absorbing plate of the installed solar collector may have a distinct angle of inclination with respect to the horizontal plane, this provides possibility that most of rivulets will contact with the rivulets' flow restricting longitudinal means from a same side.

The distributing pipe may be designed in such a manner, which ensures immediate contact of a supplied liquid medium (water, aqueous solution or thermo-stable organic liquid) with the upper section of the backside of the solar radiation absorbing plate.

For example, the distributing pipe may be designed in a following form: the distal end of the distributing pipe is sealed and there is a set of openings in the wall of this distributing pipe, which are arranged in line. The wall openings are provided with outlet connections and the distal ends of the outlet connections are terminated with flexible sleeves; also, it allows installation of the distributing pipe on the backside of the absorbing plate in such a manner that the distal ends of the flexible sleeves will be in immediate contact with the backside of the solar radiation absorbing plate.

BRIEF DESCRIPTION OF THE DRAWINGS

FIG. 5a, FIG. 5b and FIG. 5c are a top view and transverse cross-sections A-A and B-B of a grate-wise bank of strips with beads.

DESCRIPTION OF PREFERRED EMBODIMENTS

Figure 1:
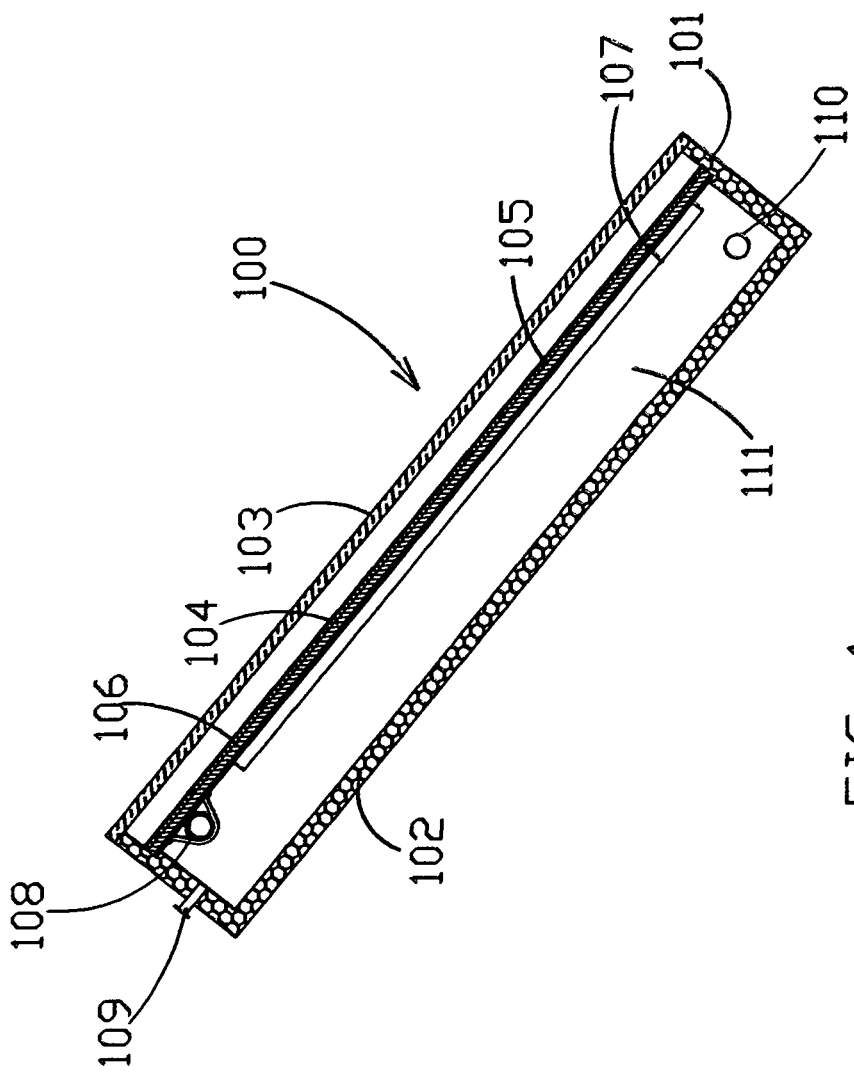
FIG. 1 demonstrates a vertical cross-section of a flat solar open-flow collector.

FIG. 1 demonstrates a vertical cross-section of a flat solar open-flow collector 100.

It comprises:

housing 101;

thermal insulation layers 102; the internal surfaces of the layers of the thermal insulation 102 are covered with impervious layers;

glazing 103 of the aperture of housing 101;

a solar radiation absorbing plate 104 which is installed underneath glazing 103 and sealed with housing 101; the front side of the solar radiation absorbing plate 104 is provided with a solar radiation absorbing coating 105 and its backside—with a corrosion resisting coating 106;

a distributing pipe 108; the proximal section of this distributing pipe 108 is placed outside housing 101 and its middle and distal sections are situated underneath of the backside of the solar radiation absorbing plate 104; the distributing pipe 108 is installed on the backside by pipe clips 112;

rivulets' flow restricting longitudinal means 107 dividing the backside of the solar radiation absorbing plate 104 into a set of parallel zones; these rivulets' flow restricting longitudinal means 107 entrap the rivulets when they meet the rivulets' flow restricting longitudinal means 107 with following flow of the rivulets along the rivulets' flow restricting longitudinal means 107;

an outlet connection 110 which is situated at the bottom section of the internal space 111 of the solar collector 100 and serves for withdrawing the water or aqueous solutions;

a venting opening 109 which provides fluid communication of the internal space 111 of the solar collector 100 with the surrounding atmosphere.

Figure 2:
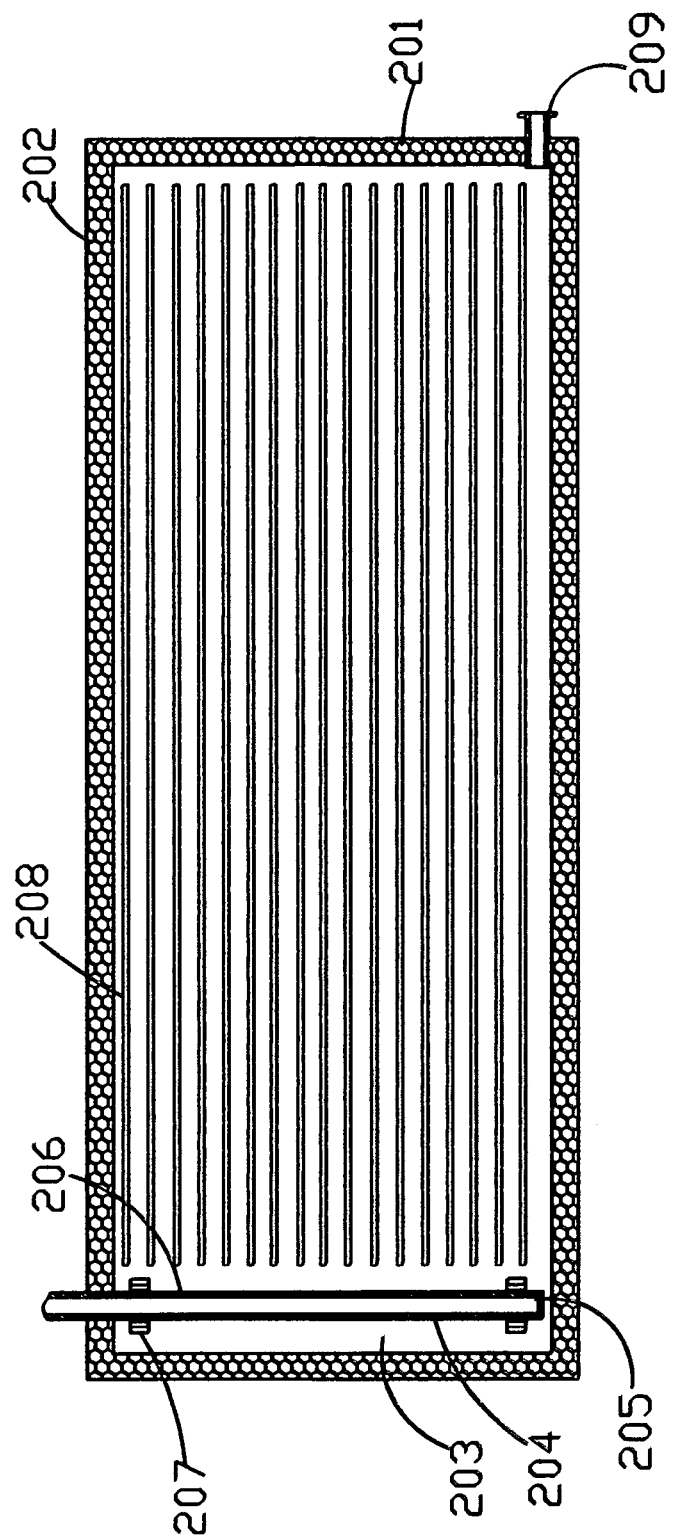
FIG. 2 is an underside view of the longitudinal section of a solar radiation absorbing plate with a bank of fridge magnets strips and a distributing pipe fastened on this solar radiation absorbing plate.

FIG. 2 demonstrates an underside view of the longitudinal section of a solar radiation absorbing plate 203, which is installed in housing 201 with layers of a thermal insulation 202. A bank of fridge magnets strips 208 and a distributing pipe 204 are fastened on the backside of the solar radiation absorbing plate 203. The distributing pipe 204 is provided with a distal plug 205 and openings 206; this distributing pipe 204 is fastened on the backside of the solar radiation absorbing plate 203 by pipe clips 207.

An outlet connection 209 serves for removal of heated water or another heat transfer liquid from the internal space of the flat solar collector.

Figure 3:
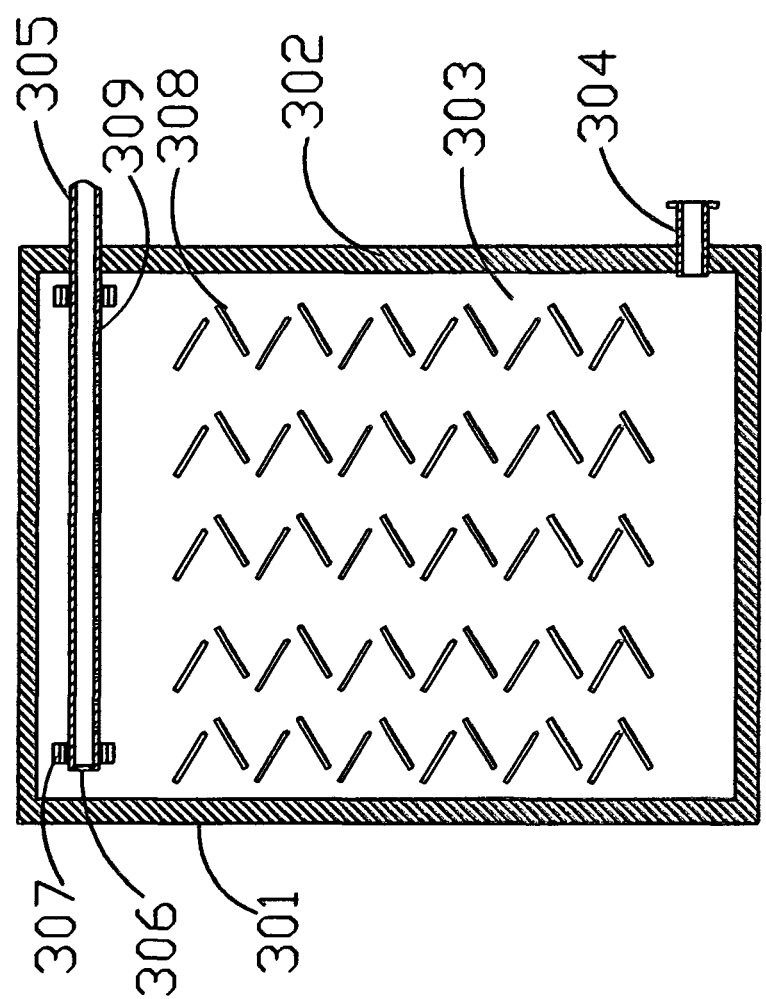
FIG. 3 is an underside view of the longitudinal section of the solar radiation absorbing plate with a zigzag longitudinal arrangements of fridge magnet strips and the distributing pipe fastened on this solar radiation absorbing plate.

FIG. 3 demonstrates an underside view of the longitudinal section of a solar radiation absorbing plate 303 with a zigzag longitudinal arrangement of fridge magnet strips 308 and a distributing pipe 305 fastened on the backside of the solar radiation absorbing plate 303. The solar radiation absorbing plate 303 is installed in housing 301 with layers of a thermal insulation 302. The distributing pipe 305 is provided with a distal plug 306 and openings 309; this distributing pipe 305 is fastened on the backside of the solar radiation absorbing plate 303 by pipe clips 307.

An outlet connection 304 serves for removal of heated water or another heat transfer liquid from the internal space of the solar collector.

Figure 4A:
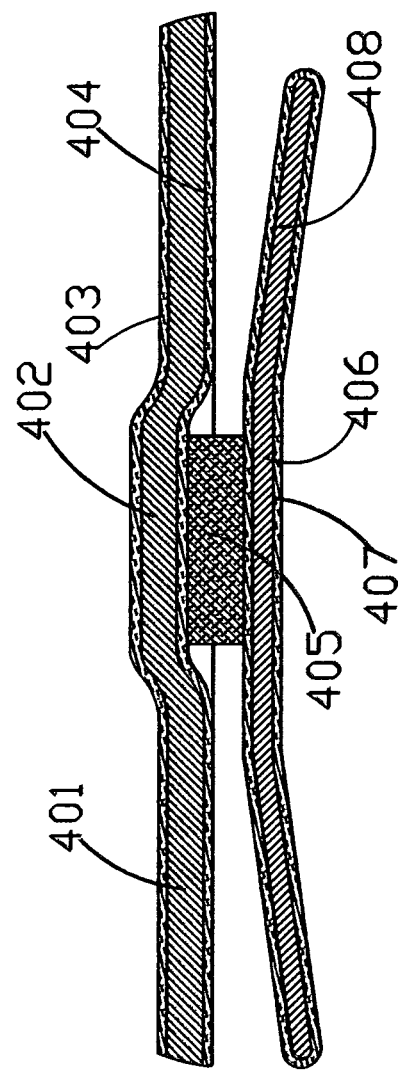
FIG. 4a is a cutaway transverse view of the absorbing plate with a shallow depression; a fridge magnet strip fastened in this depression and a strip fabricated from ferromagnetic steel, which is fastened on the fridge magnet strip, wherein the ferromagnetic steel strip is provided with two beads.

FIG. 4a is a cutaway transverse view of a solar radiation absorbing plate 401 fabricated from ferromagnetic steel; the front side of this solar radiation absorbing plate 401 is provided with a radiation absorbing coating 403; the backside of the solar radiation absorbing plate 401 is provided with a corrosion resisting coating 404; in addition, there is a shallow depression 402; a fridge magnet strip 405 is placed in depression 402 and strip 406, which is fabricated from ferromagnetic steel, is fastened on the fridge magnet strip 405, wherein strip 405 is provided with two beads 408 and a corrosion resisting coating 407.

Figure 4B:
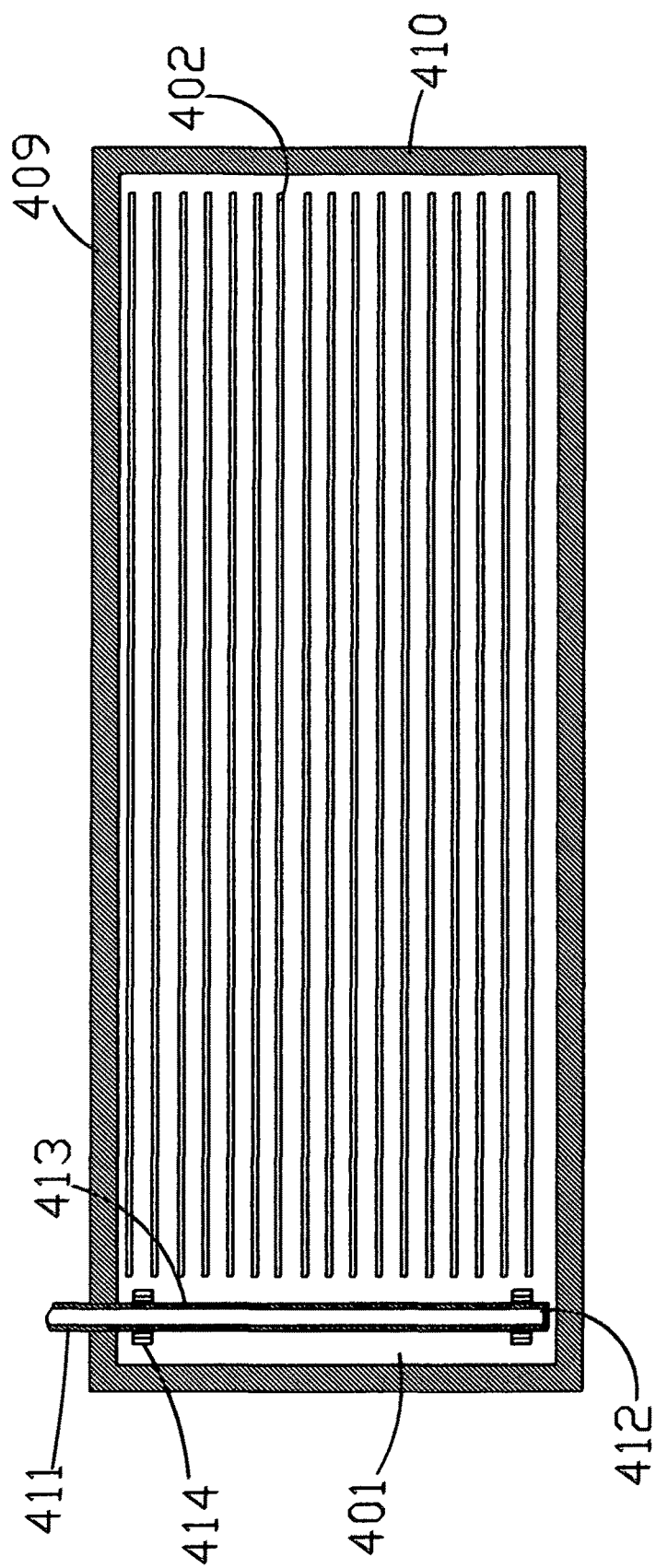
FIG. 4b is an underside view of the solar radiation absorbing plate with longitudinal depressions and the distributing pipe fastened on the backside of the solar radiation absorbing plate.

FIG. 4b is an underside view of the longitudinal section the solar radiation absorbing plate 401 installed in housing 410 with thermal insulation layers 409. The solar radiation absorbing plate is provided with the longitudinal depressions 402 and a distributing pipe 411, which is fastened on its backside by pipe clips 414. The distributing pipe 411 is provided with a distal plug 412 and openings 413.

FIG. 5a, FIG. 5b and FIG. 5c are a top view and transverse cross-sections A-A and B-B of a grate-wise bank 500 of strips provided with beads.

It comprises: extreme strips 501 with beads 502; intervening strips 503 with their beads 504; webs 505.

Figure 6:
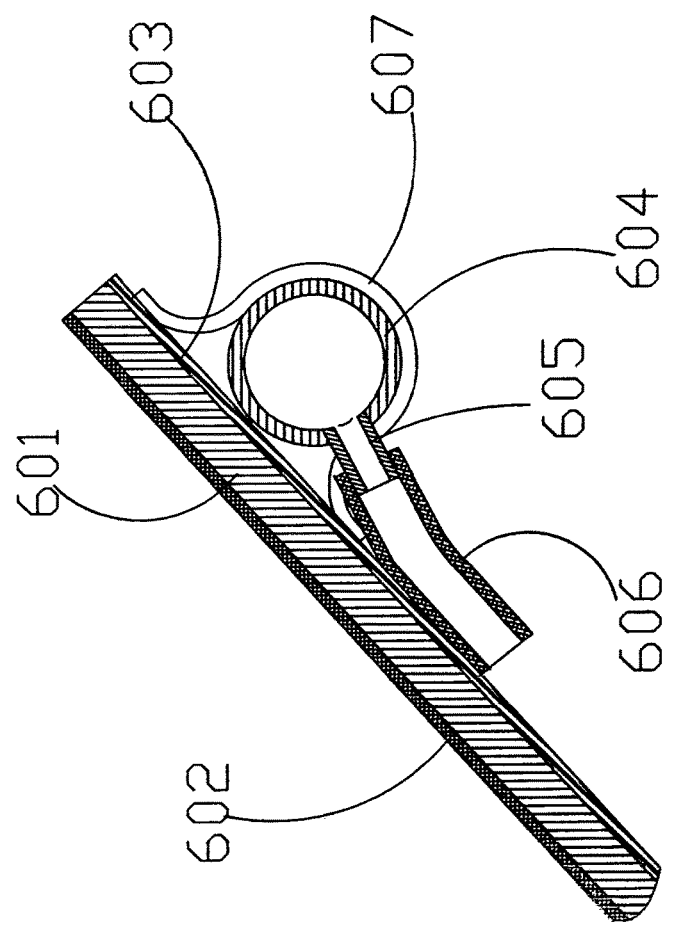

FIG. 6 is a cutaway transverse view of the upper section of a solar radiation absorbing plate 601 with a distributing pipe 604, which is installed on the upper section of the backside of the solar radiation absorbing plate 601.

The drawing depicts: the solar radiation absorbing plate 601; the front side of this absorbing plate 601 is provided with a radiation absorbing coating 602; the backside of the solar radiation absorbing plate 601 is provided with a corrosion resisting coating 603; the distributing pipe 604 is provided with nozzles 605, which are terminated with flexible sleeves 606; pipe clips 607 are installed on the backside of the absorbing plate and serve for securing the distributing pipe 604.

What is claimed is:

1. A flat open-flow solar collector comprising following main units: a housing with an internal thermal insulation of its bottom and side walls; said thermal insulation is fabricated from an impervious material; a solar radiation absorbing plate, which is joined with said housing; a distributing pipe; the proximal section of said distributing pipe is placed outside said housing, and its middle and distal sections are installed on the backside of said solar radiation absorbing plate; said distributing pipe is provided with openings, which supply water or another liquid medium onto the upper section of said backside of said solar radiation absorbing plate in the form of some rivulets; a solar radiation absorbing coating, which covers the front side of said solar radiation absorbing plate; rivulets' flow restricting longitudinal means, which divide the backside of said solar radiation absorbing plate into a set of longitudinal parallel zones; said rivulets' flow restricting longitudinal means entrap the rivulets when they meet said rivulets' flow restricting longitudinal means; said solar radiation absorbing plate is fabricated from ferromagnetic steel sheet; the backside of said solar radiation absorbing plate is covered with a corrosion resisting coating on the base of polymer organic material and said rivulets' flow restricting longitudinal means are designed as a bank of parallel fridge magnet strips, which are fastened longitudinally on the backside of the solar radiation absorbing plate; an outlet connection, which is situated in lower section of said housing of said open-flow solar collector and serves for withdrawing the water or other liquid mediums from the internal space situated between said solar radiation absorbing plate and said internal thermal insulation.

2. The flat open-flow solar collector as claimed in claim 1, wherein said flat open-flow solar collector serves for evaporation and concentration of aqueous solutions; said flat open-flow solar collector is provided with inlet and outlet connections for air supply into the space between the solar radiation absorbing plate and thermal insulation and for removal of the air from said space.

3. The flat open-flow solar collector as claimed in claim 1, wherein the upper aperture of the housing is provided with a glazing.

* * * * *